United States Patent [19]
Katayama

[11] Patent Number: 6,046,851
[45] Date of Patent: Apr. 4, 2000

[54] POLARIZATION BEAM SPLITTER AND METHOD FOR MAKING THE SAME

[75] Inventor: Ryuichi Katayama, Tokyo, Japan

[73] Assignee: NEC Corporation, Tokyo, Japan

[21] Appl. No.: 08/923,986

[22] Filed: Sep. 5, 1997

[30] Foreign Application Priority Data

Sep. 6, 1996 [JP] Japan ................................. 8-236954

[51] Int. Cl.[7] .............................................. G02B 5/30
[52] U.S. Cl. ...................................... 359/486; 359/495
[58] Field of Search .............................. 359/495, 485, 359/494, 574, 576

[56] References Cited

U.S. PATENT DOCUMENTS

| | | | |
|---|---|---|---|
| 4,991,937 | 2/1991 | Urino ....................................... | 359/566 |
| 5,455,712 | 10/1995 | Yamamoto et al. ..................... | 359/494 |
| 5,537,252 | 7/1996 | Rauch ..................................... | 359/569 |
| 5,600,486 | 2/1997 | Gal et al. ................................. | 359/569 |
| 5,739,952 | 4/1998 | Takeda et al. ........................... | 359/495 |

FOREIGN PATENT DOCUMENTS

| | | |
|---|---|---|
| 63-314502 | 12/1988 | Japan . |
| 6-27322 | 2/1994 | Japan . |
| 6-274927 | 9/1994 | Japan . |

OTHER PUBLICATIONS

G.J. Swanson, Binary Optics Technology, MIT Lincoln Laboratory, see entire document, Aug. 1989.

*Primary Examiner*—Cassandra Spyrou
*Assistant Examiner*—Jared Treas
*Attorney, Agent, or Firm*—Sughrue, Mion, Zinn, Macpeak & Seas, PLLC

[57] ABSTRACT

Disclosed is a polarization beam splitter which has; a lithium niobate or lithium tantalate substrate which has an in-plane optical axis; proton exchanging regions formed periodically on a surface of the substrate; and phase compensating film regions formed periodically on the proton exchanging regions; wherein each of the proton exchanging regions has a step cross section with $2^n$-step depths and each of the phase compensating film regions has a step cross section with $2^n$-step thicknesses corresponding to the depths of the each proton exchanging region, where n is an integer of 2 or more. Also disclosed is a method for making a polarization beam splitter which has the steps of: forming periodically first proton exchanging regions with a depth of $h_a$ on a lithium niobate or lithium tantalate substrate which has an in-plane optical axis; forming repeatedly and sequentially n-th proton exchanging regions with a depth of $h_a/2^{n-1}$ on a part of substrate or proton exchanging regions; forming periodically first phase compensating film regions with a thickness of $h_b$ on proton exchanging regions; and forming repeatedly n-th phase compensating film regions with a thickness of $h_b/2^{n-1}$ on a part of proton exchanging regions or phase compensating film regions; wherein n is an integer of 2 or more.

4 Claims, 8 Drawing Sheets

M11 MASK
11 LITHIUM NIOBATE FILM

FIG. 8B

$h_3$
12a PROTON EXCHANGING REGION

FIG. 8C

13a GROOVE
$h_4$
12b PROTON EXCHANGING REGION

FIG. 8D

M12 MASK

FIG. 8E $\frac{h_3}{2}$
12c PROTON EXCHANGING REGION

FIG. 8F

13 GROOVE
$\frac{h_4}{2}$
12 PROTON EXCHANGING REGION

15 ANTI-REFLECTION COATING
14 ANTI-REFLECTION COATING

POLARIZATION BEAM SPLITTER AND METHOD FOR MAKING THE SAME

FIELD OF THE INVENTION

This invention relates to a polarization beam splitter, and more particularly to, a diffraction-utilizing polarization beam splitter used in an optical head device for the reading of an optical disk etc. and relates to a method for making a polarization beam splitter.

BACKGROUND OF THE INVENTION

Figure 1:
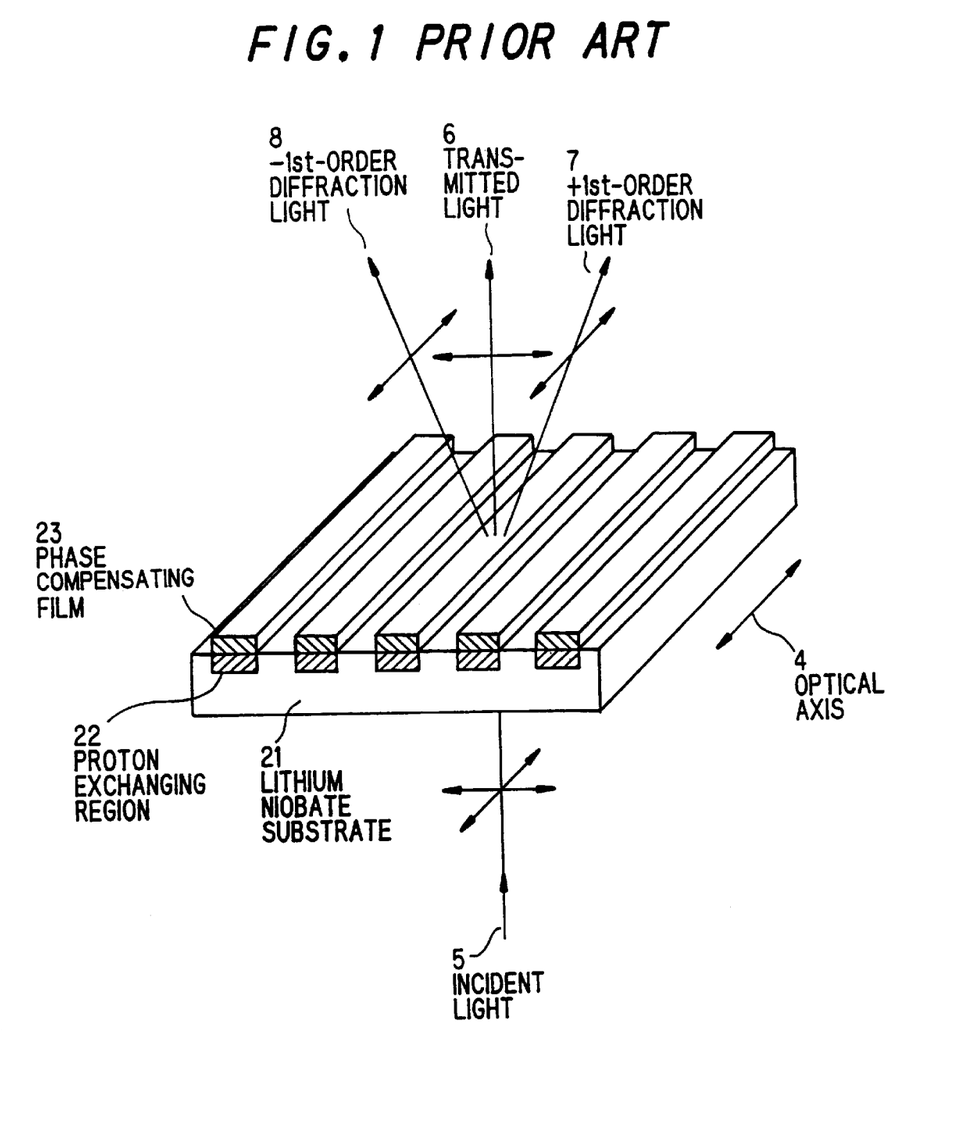
FIG. 1 is a perspective view showing a conventional polarization beam splitter.
Figure 2A:
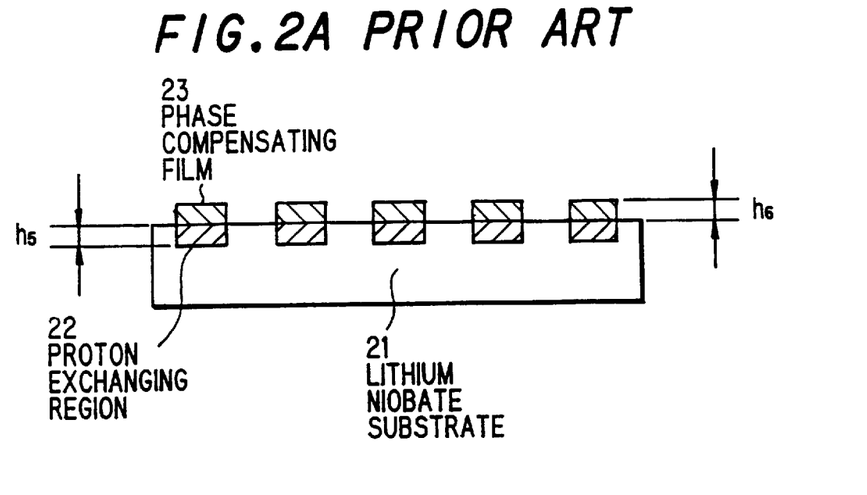
FIG. 2A is a cross sectional view showing the polarization beam splitter in FIG. 1.

Japanese patent application laid-open No.63-314502 (1988) discloses a diffraction-utilizing polarization beam splitter as shown in FIGS. 1 and 2A. In this polarization beam splitter, proton exchanging regions 22 with rectangular cross sections are periodically formed on the surface of a lithium niobate substrate 21 which has an in-plane optical axis 4, and phase compensating films 23 with rectangular cross sections are periodically formed on the proton exchanging regions 22. A component(ordinary light component) polarized vertically to the optical axis 4 of incident light 5 supplied from the lower part in FIG. 1 is transmitted through the polarization beam splitter to give transmitted light 6. On the other hand, a component (extraordinary light component) polarized parallel to the optical axis 4 of the incident light 5 is diffracted by the polarization beam splitter to give +1st-order diffraction light 7 and −1st-order diffraction light 8. The phase compensating film 23 is of, for example, $Nb_2O_5$.

Figure 2B:
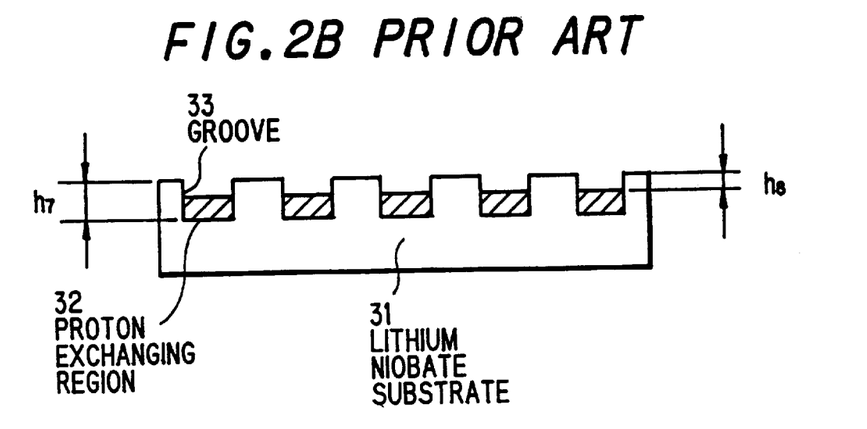
FIG. 2B is a cross sectional view showing another conventional polarization beam splitter.

Japanese patent application laid-open No.6-27322(1994) discloses another diffraction-utilizing polarization beam splitter as shown in FIG. 2B. In this polarization beam splitter, proton exchanging regions 32 with rectangular cross sections are periodically formed on the surface of a lithium niobate substrate 31, and grooves 33 with rectangular cross sections are periodically formed on the proton exchanging regions 32. A component(extraordinary light component) polarized parallel to its optical axis of incident light is transmitted through the polarization beam splitter to give transmitted light. On the other hand, a component(ordinary light component) polarized vertically to the optical axis of the incident light is diffracted by the polarization beam splitter to give +1st-order diffraction light and −1st-order diffraction light.

In FIGS. 2A and 2B, the following symbols are defined.

$\lambda$: a wavelength of incident light $\Delta n_o$: a refractive-index variation of ordinary light by proton exchanging $\Delta n_e$: a refractive-index variation of extraordinary light by proton exchanging $n_s$: a refractive index of the lithium niobate substrate 21 or 31

$n_p$: a refractive index of the phase compensating film 23

$h_5$: a depth of the proton exchanging region 22

$h_6$: a thickness of the phase compensating film 23

$h_7$: the sum of a depth of the proton exchanging region 32 and a depth of the groove 33

$h_8$; a depth of the groove 33

In case of $\lambda$=685 nm, $\Delta n_o$=−0.04, $\Delta n_e$=0.12 and $n_s$=2.2 are obtained, and, in case of the phase compensating film 23 of $Nb_2O_5$, $n_p$=2.2 is obtained.

In FIG. 2A, phase differences $\phi_o$ and $\phi_e$ between light to be transmitted through part where the proton exchanging region 22 and phase compensating film 23 are formed and light to be transmitted through part where these are not formed, to ordinary light and extraordinary light, respectively, are given by:

$$\phi_o=(2\pi/\lambda)\cdot[\Delta n_o h_5+(n_p-1)h_6] \quad (1)$$

$$\phi_e=(2\pi/\lambda)\cdot[\Delta n_e h_5+(n_p-1)h_6] \quad (2)$$

In FIG. 2B, phase differences $\phi_o$ and $\phi_e$ between light to be transmitted through part where the proton exchanging region 32 and groove 33 are formed and light to be transmitted through part where these are not formed, to ordinary light and extraordinary light, respectively, are given by:

$$\phi_o=(2\pi/\lambda)\cdot[-\Delta n_o(h_7-h_8)+(n_s-1)h_8] \quad (3)$$

$$\phi_e=(2\pi/\lambda)\cdot[-\Delta n_e(h_7-h_8)+(n_s-1)h_8] \quad (4)$$

Furthermore, transmittances $\eta_{0o}$, $\eta_{0e}$ and +1st- and −1st-order diffraction efficiencies $\eta_{1o}$, $\eta_{1e}$ to ordinary light and extraordinary light, respectively, of the polarization beam splitter are given by:

$$\eta_{0o}=\cos^2(\phi_o/2) \quad (5)$$

$$\eta_{0e}=\cos^2(\phi_e/2) \quad (6)$$

$$\eta_{1o}=(4/\pi^2)\sin^2(\phi_o/2) \quad (7)$$

$$\eta_{1e}=(4/\pi^2)\sin^2(\phi_e/2) \quad (8)$$

In FIG. 2A, in case of $\phi_o$=0 and $\phi_e$=$\pi$, ordinary light is perfectly transmitted through and extraordinary light is perfectly diffracted since $\eta_{0o}$=1 and $\eta_{0e}$=0 are obtained. In this case, $h_5$=2.14 $\mu$m and $h_6$=71.4 nm are obtained by equations (1) and (2) Also, $\eta_{1e}$=0.405 is obtained.

In FIG. 2B, in case of $\phi_o$=$\pi$ and $\phi_e$=0, extraordinary light is perfectly transmitted through and ordinary light is perfectly diffracted since $\eta_{0o}$=0 and $\eta_{0e}$=1 are obtained. In this case, $h_7$=2.35 $\mu$m and $h_8$=214 nm are obtained by equations (3) and (4). Also, $\eta_{1o}$=0.405 is obtained.

As explained above, in the conventional polarization beam splitters shown in FIGS. 2A and 2B, both the +1st- and −1st-order diffraction efficiencies of the polarization components diffracted by the polarization beam splitter are 0.405. Therefore, there are problems that, when either of the +1st- and −1st-order diffraction lights is used, the efficiency is low, and that, when both the +1st- and −1st-order diffraction lights are used, the optical system is so much complicated.

Figure 3:
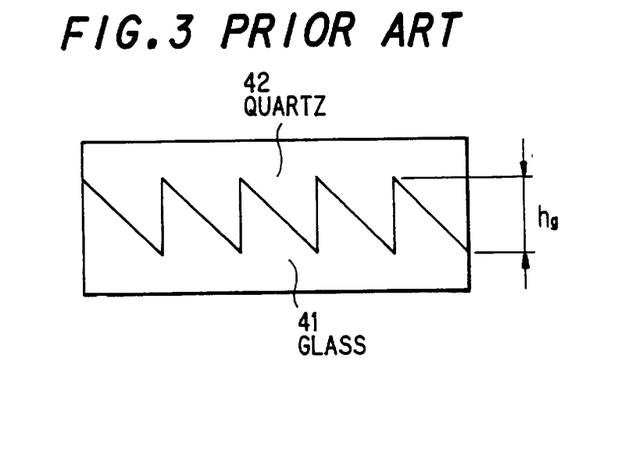
FIG. 3 is a cross sectional view showing yet another conventional polarization beam splitter.

Japanese patent application laid-open No.6-274927(1994) discloses yet another polarization beam splitter as shown in FIG. 3, where the efficiency is enhanced when either of the +1st- and −1st-order diffraction lights is used. In this polarization beam splitter, glass 41 as an isotropic medium and quartz 42 as an anisotropic medium are Functioned at boundary planes with a saw-toothed cross section. A component (ordinary light component) polarized vertically to the optical axis of the quartz 42 is transmitted through the polarization beam splitter to give transmitted light. On the other hand, a component (extraordinary light component) polarized parallel to the optical axis of the quartz 42 is diffracted by the polarization beam splitter to give +1st-order diffraction light.

In FIG. 3, the following symbols are defined.

$\lambda$: a wavelength of incident light $n_Q$: a refractive index of the glass 41

$n_{qo}$: a refractive index of ordinary light to the quartz 42

$n_{qe}$: a refractive index of extraordinary light to the quartz 42

$h_g$: a height of the saw-toothed part

According to an example in the above application, $\lambda=856.3$ nm, $n_Q=1.5419$, $n_{qo}=1.5419$ and $n_{qe}=1.5509$ are obtained.

In FIG. 3, transmittances $\eta_{0o}$, $\eta_{0o}$ and +1st-order diffraction efficiencies $\eta_{+1o}$, $\eta_{+1e}$ to ordinary light and extraordinary light, respectively, of the polarization beam splitter are given by:

$$\eta_{0o}=\sin^2\phi_o/\phi_o^2 \tag{9}$$

$$\eta_{0e}=\sin^2\phi_e/\phi_e^2 \tag{10}$$

$$\eta_{1o}=\sin^2\phi_o/(\phi_o-\pi)^2 \tag{11}$$

$$\eta_{1e}=\sin^2\phi_e/(\phi_e-\pi)^2 \tag{12}$$

where $\phi_o$, $\phi_e$ be are given by:

$$\phi_o=(2\pi/\lambda)\cdot(n_{qo}-n_Q)h_g/2 \tag{13}$$

$$\phi_e=(2\pi/\lambda)\cdot(n_{qe}-n_Q)h_g/2 \tag{14}$$

Thus, $\phi_o=0$ is obtained by equation (13). In case of $\phi_e=\pi$, ordinary light is perfectly transmitted through and extraordinary light is perfectly diffracted since $\eta_{0o}=1$ and $\eta_{0e}=0$ are obtained. In this case, $h_g=72.9$ μm is obtained by equation (14). Also, $\eta_{+1e}=1$ is obtained.

As explained above, in the conventional polarization beam splitter in FIG. 3, a high efficiency can be obtained even when only the +1st-order diffraction light is used since the +1st-order diffraction efficiency of the polarization component diffracted by the polarization beam splitter is 1.

However, the above polarization beam splitter has some problems. First, it is difficult to select a medium combination that the refractive index of an isotropic medium is equal to that of an anisotropic medium to ordinary light or extraordinary light. Second, it is difficult to form an isotropic medium and an anisotropic medium to have saw-toothed part with a height of several tens μm and, further, to junction them. Third, when the grating is composed of a curved pattern or combining different patterns, the formation of the saw-toothed part itself is very difficult.

SUMMARY OF THE INVENTION

Accordingly, it is an object of the invention to provide a polarization beam splitter where a high efficiency can be obtained even when either +1st-order diffraction light or −1st-order diffraction light is used.

It is a further object of the invention to provide a method for making a polarization beam splitter by which a polarization beam splitter with a high efficiency can be easily produced.

According to the invention, a polarization beam splitter, comprises:

a lithium niobate or lithium tantalate substrate which has an in-plane optical axis;

proton exchanging regions formed periodically on a surface of the substrate; and phase compensating film regions formed periodically on the proton exchanging regions;

wherein each of the proton exchanging regions has a step cross section with $2^n$-step depths and each of the phase compensating film regions has a step cross section with $2^n$-step thicknesses corresponding to the depths of the each proton exchanging region, where n is an integer of 2 or more.

According to another aspect of the invention, a polarization beam splitter, comprises:

a lithium niobate or lithium tantalate substrate which has an in-plane optical axis;

proton exchanging regions formed periodically on a surface of the substrate; and grooves formed periodically on the proton exchanging regions;

wherein each of the proton exchanging regions and each of the grooves have a step cross section with $2^n$-step depths, where n is an integer of 2 or more.

According to another aspect of the invention, a method for making a polarization beam splitter, comprises the steps of:

forming periodically first proton exchanging regions with a depth of $h_a$ on a lithium niobate or lithium tantalate substrate which has an in-plane optical axis;

forming repeatedly and sequentially n-th proton exchanging regions with a depth of $h_a/2^{n-1}$ on a part of the substrate or proton exchanging regions;

forming periodically first phase compensating film regions with a thickness of $h_b$ on proton exchanging regions; and forming repeatedly n-th phase compensating film regions with a thickness of $h_b/2^{n-1}$ on a part of the proton exchanging regions or phase compensating film regions;

wherein n is an integer of 2 or more.

According to another aspect of the invention, a method for making a polarization beam splitter, comprises the steps of:

forming periodically first proton exchanging regions with a depth of $h_a$ on a lithium niobate or lithium tantalate substrate which has an in-plane optical axis;

etching by a depth of $h_o$ the top surface of the proton exchanging regions to form first grooves; and repeatedly forming n-th proton exchanging regions with a depth of $h_a/2^{n-1}$ while masking a part of the substrate or proton exchanging regions and etching by a depth of $h_o/2^{n-1}$ the top surface of the n-th proton exchanging regions to form n-th grooves;

wherein n is an integer of 2 or more.

In a polarization beam splitter of the present invention, proton exchanging regions, each of which has a step cross section wit $2^n$-step depths, are formed periodically on the surface of a lithium niobate or lithium tantalate substrate which has an in-plane optical axis, and phase compensating film regions or groves, each of which has a step cross section with $2^n$-step thicknesses or depths, are formed periodically on the proton exchanging regions. Therefore, one of +1st- and −1st-order diffraction efficiencies of the polarization components diffracted by the polarization beam splitter is higher than the other. As a result, a high efficiency can be obtained even when only one of +1st- and −1st-order diffraction lights is used.

Also, according to the present invention, a polarization beam splitter with a high efficiency can be easily produced. The reasons are as follows: First, the material of the phase compensating film can be optionally selected. Second, the depth of the proton exchanging region, thickness of the phase compensating film and depth of the groove are less than several μm. Third, by employing photolithography process, the method can be applied to any pattern of grating.

BRIEF DESCRIPTION OF THE DRAWINGS

The invention will be explained in more detail in conjunction with the appended drawings, wherein.

DESCRIPTION OF THE PREFERRED EMBODIMENTS

Figure 4:
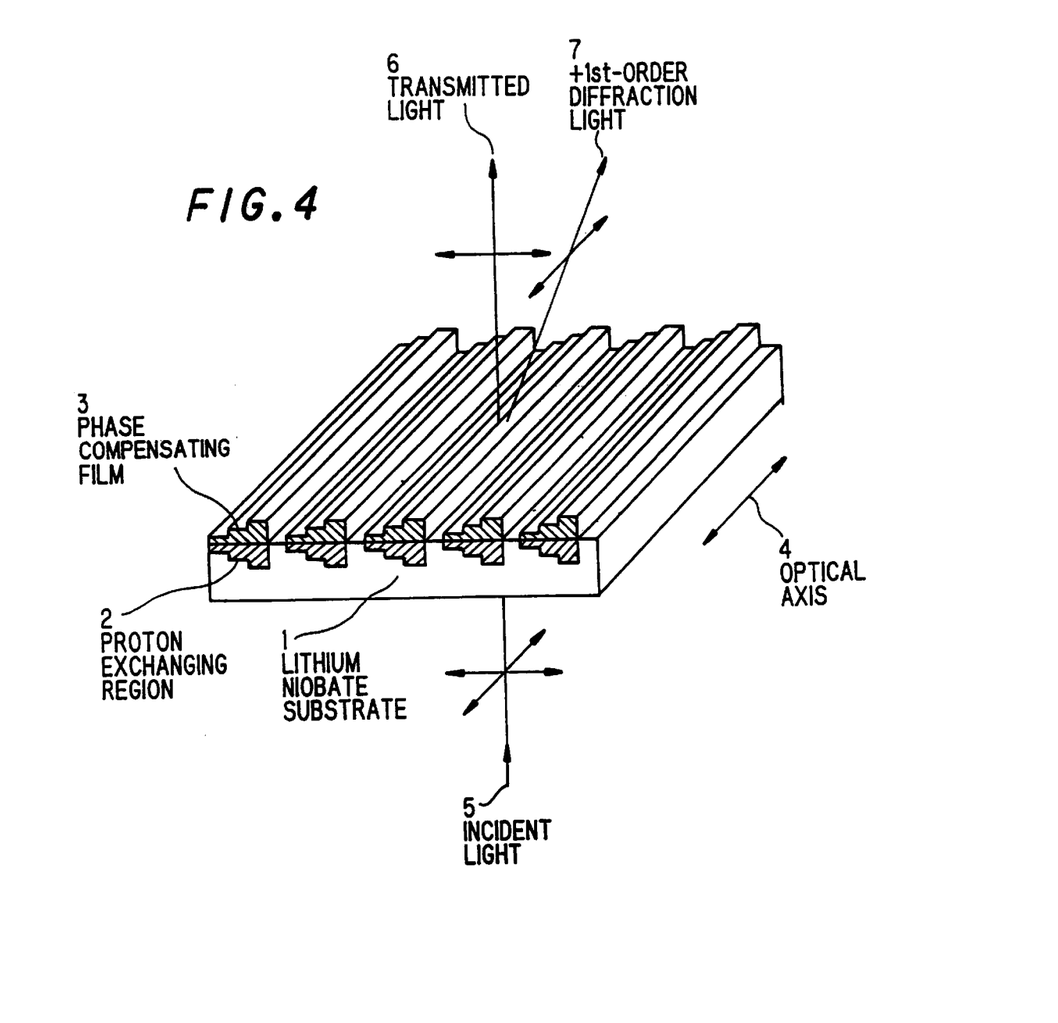
FIG. 4 is a perspective view showing a polarization beam splitter in a first preferred embodiment according to the invention.

A polarization beam splitter in the first preferred embodiment will be explained in FIGS. 4 and 5A. In the first embodiment, proton exchanging regions 2 with step cross sections, each of which is composed of four-step depths including zero step, are periodically formed on the surface of a lithium niobate substrate 1 which has an in-plane optical axis 4, and phase compensating films 3 with step cross sections, each of which is composed of four-step thicknesses including zero step, are periodically formed on the respective proton exchanging regions 2. Namely, in the first embodiment, where n=2 is taken, the proton exchanging region 2 has the step cross section with $4(=2^2)$-step depths and the phase compensating film 3 has the step cross section with $4(=2^2)$-step thicknesses.

In this polarization beam splitter, a component (ordinary light component) polarized vertically to the optical axis 4 of incident light 5 is transmitted through the polarization beam splitter to give transmitted light 6. On the other hand, a component (extraordinary light component) polarized parallel to the optical axis 4 of the incident light 5 is diffracted by the polarization beam splitter to give +1st-order diffraction light 7. The phase compensating film 3 is of, for example, $Nb_2O_5$.

A polarization beam splitter in the second preferred embodiment will be explained in FIG. 5B. In the second embodiment, proton exchanging regions 12 with step cross sections, each of which is composed of four-step depths including zero step, are periodically formed on the surface of a lithium niobate substrate 11 which has an in-plane optical axis, and grooves 13 with step cross sections, each of which is composed of four-step depths including zero step, are periodically formed on the respective proton exchanging regions 12. Namely, in the second embodiment, where n=2 is taken, the proton exchanging region 12 and groove 13 have the step cross section with $4(=2^2)$-step depths.

In this polarization beam splitter, a component (extraordinary light component) polarized parallel to the optical axis of incident light is transmitted through the polarization beam splitter to give transmitted light. On the other hand, a component (ordinary light component) polarized vertically to the optical axis of the incident light is diffracted by the polarization beam splitter to give +1st-order diffraction light.

Figure 5A:
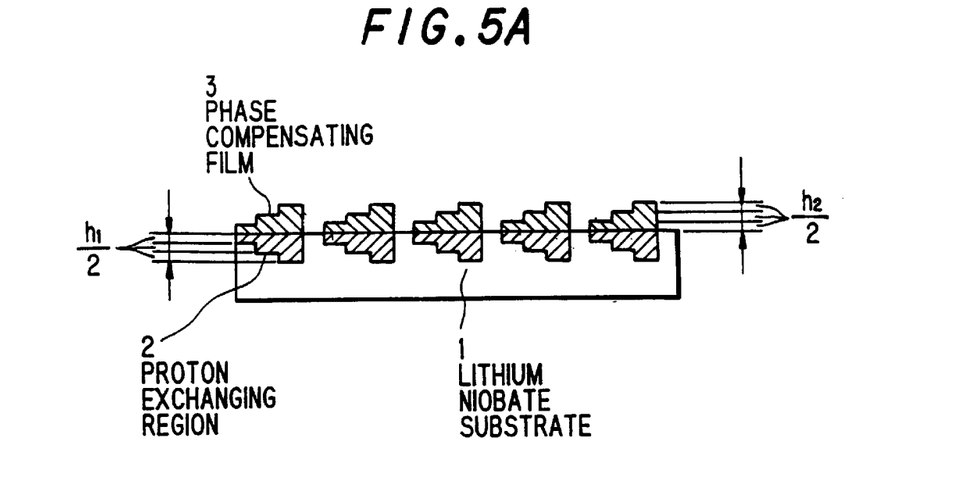
FIG. 5A is a cross sectional view showing the polarization beam splitter in FIG. 4.
Figure 5B:
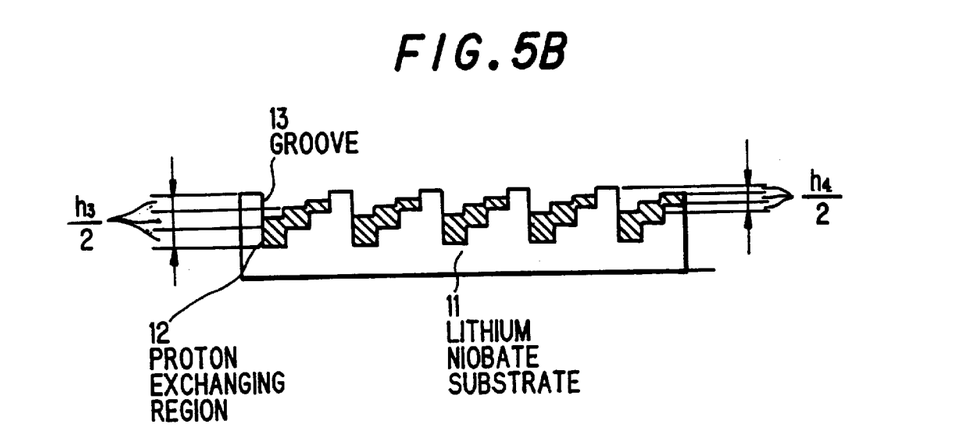
FIG. 5B is a cross sectional view showing a polarization beam splitter in a second preferred embodiment according to the invention.

In FIGS. 5A and 5B, the following symbols are defined.

$\lambda$: a wavelength of incident light $\Delta n_o$: a refractive-index variation of ordinary light by proton exchanging $\Delta n_e$: a refractive-index variation of extraordinary light by proton exchanging $n_s$: a refractive index of the lithium niobate substrate 1 or 11

$n_p$: a refractive index of the phase compensating film 3

$h_1/2$: a depth difference between adjacent steps of the proton exchanging region 2

$h_2/2$: a thickness difference between adjacent steps of the phase compensating film 3

$h_3/2$: the sum of a depth difference between adjacent steps of the proton exchanging region 12 and a depth difference between adjacent steps of the groove 13

$h_4/2$: a depth difference between adjacent steps of the groove 13

In case of $\lambda=685$ nm, $\Delta n_o=-0.04$, $\Delta n_e=0.12$ and $n_s=2.2$ are obtained, and, in case of the phase compensating film 23 of $Nb_2O_5$, =2.2 is obtained.

In the first embodiment as shown in FIG. 5A, phase differences $\phi_o/2$ and $\phi_e/2$ between lights to be transmitted through adjacent steps, each of which is composed of the proton exchanging region 2 and phase compensating film 3, to ordinary light and extraordinary light, respectively, are given by:

$$\phi_o=(2\pi/\lambda)\cdot[\Delta n_o h_1+(n_p-1)h_2] \quad (15)$$

$$\phi_e=(2\pi/\lambda)\cdot[\Delta n_e h_1+(n_p-1)h_2] \quad (16)$$

Also, in the second embodiment as shown in FIG. 5B, phase differences $\phi_o/2$ and $\phi_e/2$ between lights to be transmitted through adjacent steps, each of which is composed of the proton exchanging region 12 and groove 13, to ordinary light and extraordinary light, respectively, are given by:

$$\phi_o=(2\pi/\lambda)\cdot[-\Delta n_o(h_3-h_4)+(n_s-1)h_4] \quad (17)$$

$$\phi_e=(2\pi/\lambda)\cdot[-\Delta n_e(h_3-h_4)+(n_s-1)h_4] \quad (18)$$

Furthermore, transmittances $\eta_{0o}$, $\eta_{0e}$, +1st-order diffraction efficiencies $\eta_{+1o}$, $\eta_{+1e}$ and −1st-order diffraction efficiencies $\eta_{-1o}$, $\eta_{-1e}$ to ordinary light and extraordinary light, respectively, of the polarization beam splitter are given by:

$$\eta_{0o}=\cos^2(\phi_o/2)\cos^2(\phi_o/4) \quad (19)$$

$$\eta_{0e} = \cos^2(\phi_e/2)\cos^2(\phi_e/4) \quad (20)$$

$$\eta_{+1o} = (8/\pi^2)\sin^2(\phi_o/2)\cos^2[(\phi_o-\pi)/4] \quad (21)$$

$$\eta_{+1e} = (8/\pi^2)\sin^2(\phi_e/2)\cos^2[(\phi_e-\pi)/4] \quad (22)$$

$$\eta_{-1o} = (8/\pi^2)\sin^2(\phi_o/2)\cos^2[(\phi_o+\pi)/4] \quad (23)$$

$$\eta_{-1e} = (8/\pi^2)\sin^2(\phi_e/2)\cos^2[(\phi_e+\pi)/4] \quad (24)$$

In the first embodiment in FIG. 5A, in case of $\phi_o=0$ and $\phi_e=\pi$, ordinary light is perfectly transmitted through and extraordinary lights is perfectly diffracted since $\eta_{0o}=1$ and $\eta_{0e}=0$ are obtained. In this case, $h_1=2.14$ μm and $h_2=71.4$ nm are obtained by equations (15) and (16). Also, $\eta_{+1e}=0.81$ and $\eta_{-1e}=0$ are obtained.

In the second embodiment in FIG. 5B, in case of $\phi_o=\pi$ and $\phi_e=0$, extraordinary light is perfectly transmitted through and ordinary light is perfectly diffracted since $\eta_{0o}=0$ and $\eta_{0e}=1$ are obtained. In this case, $h_3=2.35$ μm and $h_4=214$ nm are obtained by equations (17) and (18). Also, $\eta_{+1o}=0.81$ and $\eta_{-1o}=0$ are obtained.

As described above, in the first and second embodiments, where the +1st-order diffraction efficiency of the polarization component diffracted by the polarization beam splitter is 0.81 and 1st-order diffraction efficiency thereof is 0, the high efficiency can be obtained even when only the +1st-order diffraction light is used.

Though, in the first and second embodiments, the substrate is of lithium niobate, it may be of lithium tantalate. Also, the phase compensating film 3 in the first embodiment may be of $Ta_2O_5$, $TiO_2$ or the like, other than $Nb_2O_5$.

Figure 6A:
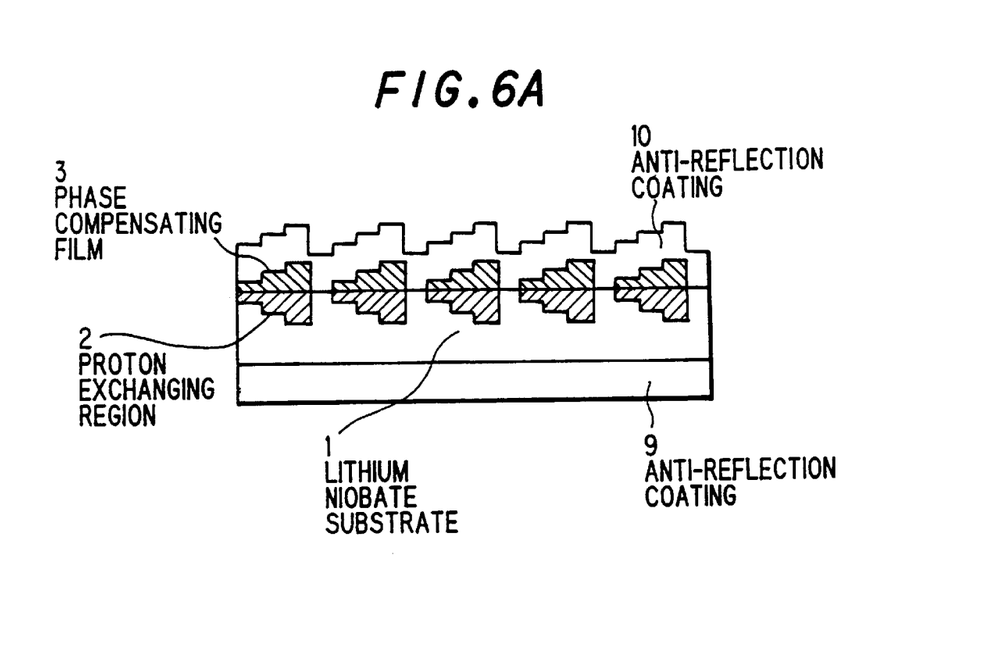
FIG. 6A is a cross sectional view showing a polarization beam splitter in a third preferred embodiment according to the invention.
Figure 6B:
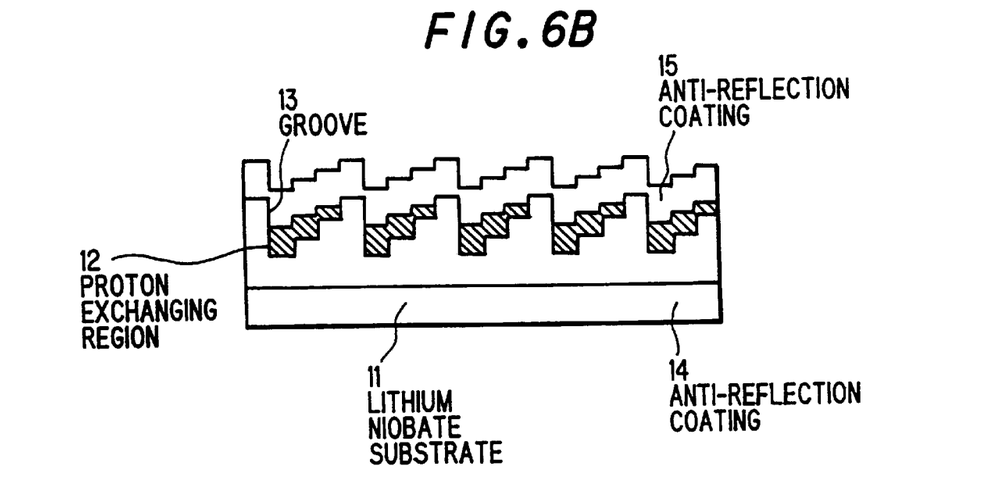
FIG. 6B is a cross sectional view showing a polarization beam splitter in a fourth preferred embodiment according to the invention.

Polarization beam splitters in the third and fourth preferred embodiments will be explained in FIGS. 6A and 6B, respectively. In the third embodiment as shown in FIG. 6A, an anti-reflection coating 10 is formed on the front surface of the lithium niobate substrate I in the first embodiment shown in FIG. 5A and an anti-reflection coating 9 is formed on the back surface of the substrate 1. In the fourth embodiment as shown in FIG. 6B, an anti-reflection coating 15 is formed on the front surface of the lithium niobate substrate 11 in the second embodiment shown in FIG. 5B and an anti-reflection coating 14 is formed on the back surface of the substrate 11. These anti-reflection coatings 9, 10, 14 and 15 are of, for example, $Si)_2$. The requirements of the anti-reflection coatings are given by $n_a=n_p^{1/2}$ (or $n_s^{1/2}$) and $h_a=\lambda/4n_a$ where the refractive index is $n_a$ and the thickness is $h_a$. In case of $\lambda=685$ nm, when the anti-reflection coatings 9, 10, 14 and 15 are of $SiO_2$, $n_a=1.46$ is obtained, therefore almost satisfying the former requirement. Furthermore, when $h_a=117$ nm is given, the latter requirement is satisfied.

A method for making a polarization beam splitter in the first preferred embodiment will be FIGS. 7A to 7J. This method corresponds to the polarization beam splitters in the first and third embodiments in FIGS. 5A and 6A, respectively.

Figures 7A, 7B, 7C, 7D, 7E, 7F, 7G, 7H, 7I, 7J:
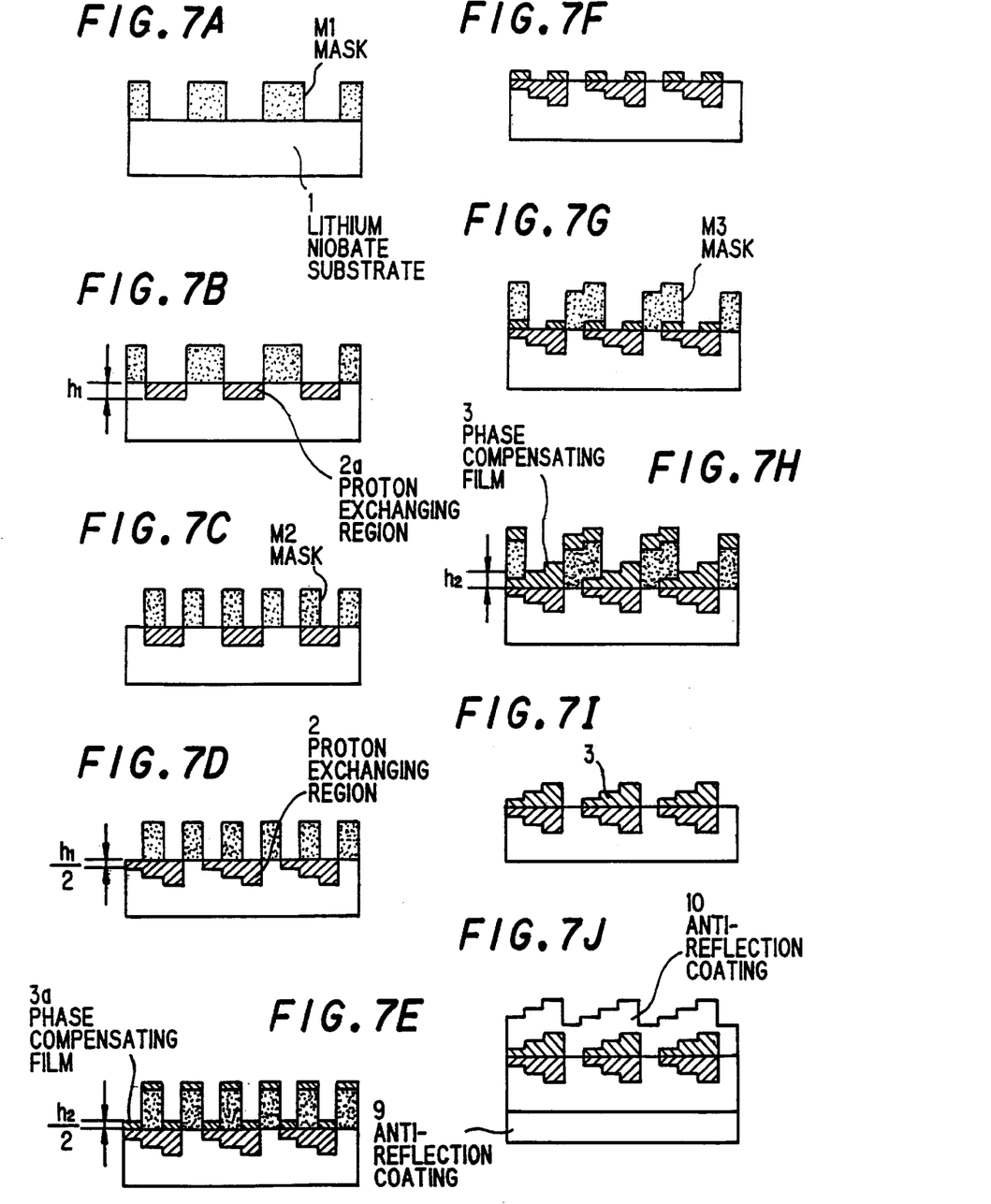
FIGS. 7A to 7J are cross sectional views showing a method for making a polarization beam splitter in a first preferred embodiment according to the invention, which corresponds to the polorization beam splitters in the first and third embodiments.

First, as shown in FIG. 7A, a pattern of periodical masks M1 is formed on the lithium niobate substrate 1. The mask M1 is of, for example, Ti, Al or the like. Then, as shown in FIG. 7B, by dipping the lithium niobate substrate 1 into a benzoic acid solution etc. to proton-exchange by a depth of $h_1$ part where the masks M1 are not formed, periodical proton exchanging regions 2a with rectangular cross sections are formed.

Next, as shown in FIG. 7C, after removing the masks M1 on the lithium niobate substrate 1, a pattern of periodical masks M2 with a half period of the mask M1 is formed according to the period of the masks M1. Then, as shown in FIG. 7D, by dipping the lithium niobate substrate 1 into a benzoic acid solution etc. to proton-exchange by a depth of $h_1/2$ part where the masks M2 are not formed, periodical proton exchanging regions 2 with cross sections, each of which is composed of four-step depths including zero depth, are formed.

Then, as shown in FIG. 7E, $h_2/2$ thick phase compensating film is formed on the lithium niobate substrate 1 and masks M2 by sputtering etc., thereby giving periodical phase compensating film regions 3a with rectangular cross sections. Then, as shown in FIG. 7F, the masks M2 on the lithium niobate substrate 1 are removed, and the phase compensating film formed on the masks M2 is thereby removed simultaneously. Further, as shown in FIG. 7G, a pattern of periodical masks M3 with the same period as the masks M1 is formed on the lithium niobate substrate 1. Then, as rrp shown in FIG. 7H, $h_2$ thick phase compensating film is formed on the lithium niobate substrate 1 and masks M3 by sputtering etc., thereby giving periodical phase compensating film regions 3 with step cross sections, each of which is composed of four-step thicknesses including zero depth.

Finally, as shown in FIG. 7I, the masks M3 on the lithium niobate substrate 1 are removed, and the phase compensating film formed on the masks M3 is thereby removed simultaneously, thereby giving the polarization beam splitter. Optionally, as shown in FIG. 7J, the anti-reflection coatings 10, 9 are formed on the front surface and back surface, respectively, of the lithium niobate substrate 1 by sputtering etc.

A method for making a polarization beam splitter in the second preferred embodiment will be FIGS. 8A to 8J. This method corresponds to the polarization beam splitters in the second and fourth embodiments in FIGS. 5B and 6B, respectively.

Figure 8A:
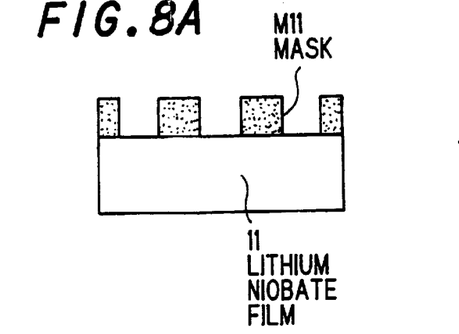
FIGS. 8A to 8H are cross sectional views showing a method for making a polarization beam splitter in a second preferred embodiment according to the invention, which corresponds to the polorization beam splitters in the second and fourth embodiments.
Figure 8B:
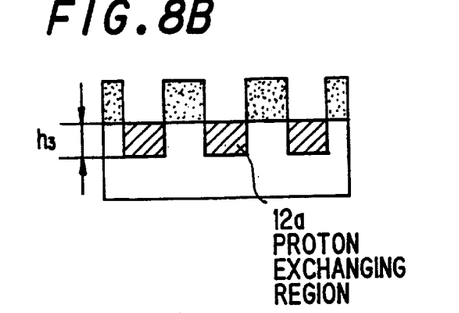
Figure 8C:
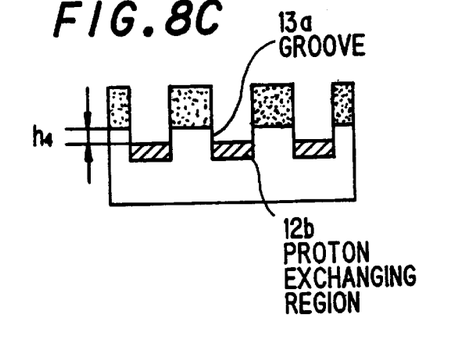

First, as shown in FIG. 8A, a pattern of periodical masks M11 is formed on the lithium niobate substrate 11. The mask M11 is of, for example, Ti, Al or the like. Then, as shown in FIG. 8B, by dipping the lithium niobate substrate 11 into a benzoic acid solution etc. to proton-exchange by a depth of $h_3$ part where the masks M11 are not formed, periodical proton exchanging regions 12a with rectangular cross sections are formed. Then, as shown in FIG. 8C, by dipping the lithium niobate substrate 11 into a hydrofluoric acid solution etc. to etch by a depth of $h_4$ part where the masks M11 are not formed, periodical proton exchanging regions 12b and grooves 13a are formed.

Figure 8D:
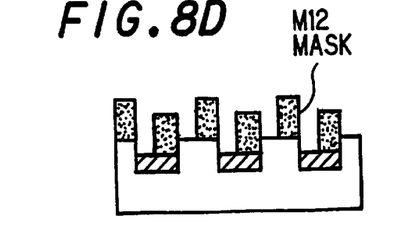
Figure 8E:
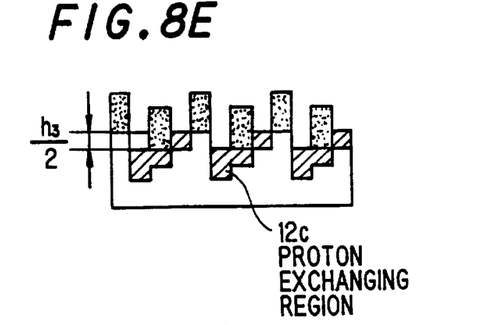
Figure 8F:
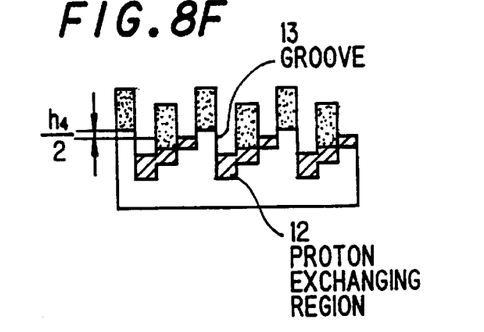

Next, as shown in FIG. 8D, after removing the masks M11 on the lithium niobate substrate 11, a pattern of periodical masks M12 with a half period of the mask M11 is formed according to the period of the masks M11. Then, as shown in FIG. 8E, by dipping the lithium niobate substrate 11 into a benzoic acid solution etc. to proton-exchange by a depth of $h_3/2$ part where the masks M12 are not formed, periodical proton exchanging regions 12c are formed. Then, as shown in FIG. 8F, by dipping the lithium niobate substrate 11 into a hydrofluoric acid solution etc. to etch by a depth of $h_4/2$ part where the masks M12 are not formed, the periodical proton exchanging regions 12 and grooves 13 with step cross sections, each of which is composed of four-step depths, are formed.

Figure 8G:
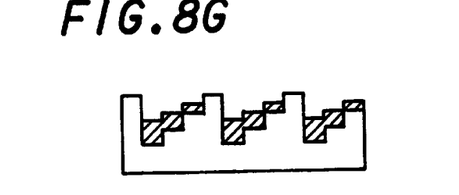
Figure 8H:
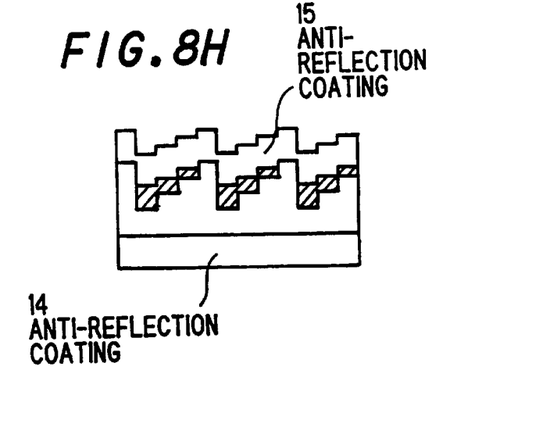

Finally, as shown in FIG. 8G, the masks M12 on the lithium niobate substrate 11 are removed, thereby giving the polarization beam splitter. Optionally, as shown in FIG. 8H, the anti-reflection coatings 15, 14 are formed on the front surface and back surface, respectively, of the lithium niobate substrate 11 by sputtering etc.

Next, polarization beam splitters in the fifth to seventh preferred embodiments will be explained in FIGS. 9A to 9C.

Figure 9A:
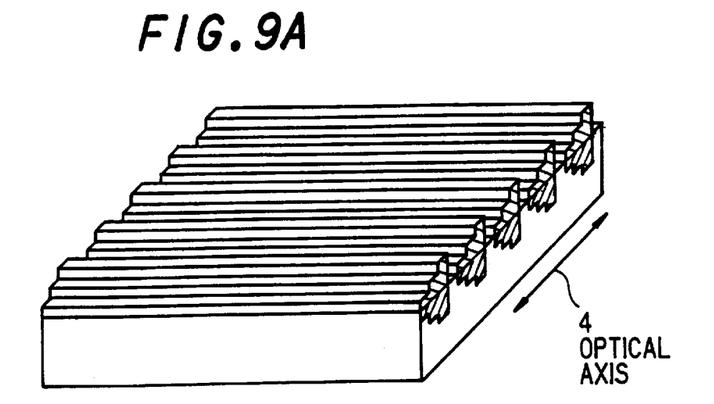
FIG. 9A is a perspective view showing a polarization beam splitter in a fifth preferred embodiment according to the invention.
Figure 9B:
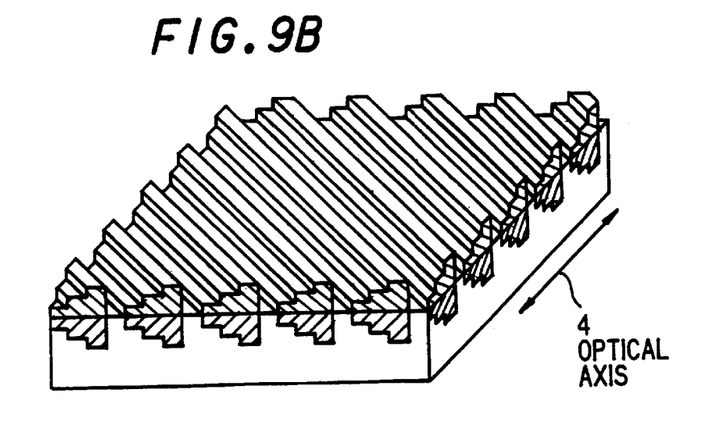
FIG. 9B is a perspective view showing a polarization beam splitter in a sixth preferred embodiment according to the invention.
Figure 9C:
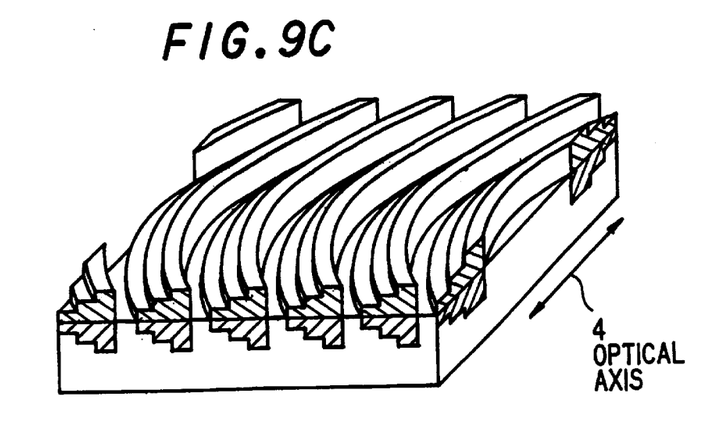
FIG. 9C is a perspective view showing a polarization beam splitter in a seventh preferred embodiment according to the invention.

In the fifth embodiment, the direction of the grating is, as shown in FIG. 9A, perpendicular to the optical axis, while the grating in the first embodiment is parallel to the optical axis 4. In the sixth embodiment, the direction of the grating is, as shown in FIG. 9B, oblique to the optical axis 4. In the seventh embodiment, the pattern of the grating is curved. Meanwhile, the grating may have another pattern, e.g. a pattern of concentric circles or a combination of different patterns. Though, in the fifth to seventh embodiments, the cross sections have the same shape as those in the first embodiment shown in FIG. 5A, it may have the same shape an those in the second embodiment shown in FIG. 5B.

Though, in the first embodiment in FIG. 5A, both the depths of the proton exchanging region and the thicknesses of the phase compensating film are of four steps, they may be of any steps represented by $2^n$ where n is an integer of 2 or more. In case of four steps, the phase differences between lights to be transmitted through adjacent steps are 0 and $\pi/2$ to ordinary light and extraordinary light, respectively. In case of $2^n$ steps, those are to be 0 and $2\pi/2^n$ to ordinary light and extraordinary light, respectively. Also, in case of four steps, the +1st-order diffraction efficiency of extraordinary light is 0.81. For example, in case of eight steps, it can be further increased to 0.95. In this case, the fabrication method may be so arranged that the processes as shown in FIGS. 7C to 7G are further inserted between the processes as shown in FIGS. 7D and 7E. Meanwhile, the mask period needs to be halved.

Though, in the second embodiment in FIG. 5B, both the depths of the proton-exchanging region and the groove are of four steps, they may be of any steps represented by $2^n$ where n is an integer of 2 or more. In case of four steps, the phase differences between lights to be transmitted through adjacent steps are $\pi/2$ and 0 to ordinary light and extraordinary light, respectively. In case of $2^n$ steps, those are to be $2\pi/2^n$ and 0 to ordinary light and extraordinary light, respectively. Also, in case of four steps, the +1st-order diffraction efficiency of ordinary light is 0.81. For example, in case of eight steps, it can be further increased to 0.95. In this case, the fabrication method may be so arranged that the processes as shown in FIGS. 8D to 8F are further inserted after the process as shown in FIG. 8F. For this arrangement, for example, the mask period needs to be halved.

In the above embodiments, one of ordinary light and extraordinary light is perfectly transmitted through and the other is perfectly diffracted. However, the invention is not limited to these embodiments and is similarly applicable to a polarization beam splitter where its transmittances and +1st- or −1st-order diffraction efficiencies to ordinary light and extraordinary light are different from each other.

Although the invention has been. described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A polarization beam splitter, comprising:

a lithium niobate or lithium tantalate substrate which has an in-plane optical axis;

proton exchanging regions formed periodically on a surface of said substrate; and grooves formed periodically on said proton exchanging regions;

wherein each of said proton exchanging regions and each of said grooves have a step cross section with $2^n$-step depths, where n is an integer of 2 or more.

2. A polarization beam splitter, according to claim 1, wherein:

said depths of said each proton exchanging region and said each groove are so set that phase differences between lights to be transmitted through adjacent steps are $2\pi/2^n$ and 0 to ordinary light and extraordinary light, respectively.

3. A polarization beam splitter, according to claim 1, wherein:

said substrate has anti-reflection coatings formed on its front and back surface.

4. A method for making a polarization beam splitter, comprising the steps of:

forming periodically first proton exchanging regions with a depth of $h_a$ on a lithium niobate or lithium tantalate substrate which has an in-plane optical axis;

etching by a depth of $h_c$ the top surface of said proton exchanging regions to form first grooves; and repeatedly forming n-th proton exchanging regions with a depth of $h_a/2^{n-1}$ while masking a part of the substrate or proton exchanging regions and etching by a depth of $h_c/2^{n-1}$ the top surface of said proton exchanging regions to form n-th grooves;

wherein n is an integer of 2 or more.

* * * * *

UNITED STATES PATENT AND TRADEMARK OFFICE
CERTIFICATE OF CORRECTION

PATENT NO.: 6,046,851
DATED: April 4, 2000
INVENTOR(S): Ryuichi KATAYAMA It is certified that error(s) appears in the above-identified patent and that said Letters Patent is hereby corrected as shown below:

Column 2, line 23 (eq. 6) delete "$\phi_e$" insert --$\phi_8$--
        line 53 delete "Functioned" insert --junctioned--
Column 3, line 12 delete "$\eta_{1o}$" insert --$\eta_{+1o}$--
        line 15 (eq. 12) delete "$\eta_{1e}$" insert --$\eta_{+1e}$--
Column 6, line 43 after "$Nb_2O_5$" insert --$N_p$--
Column 7, line 43 delete "$Si)_2$" insert --$SiO_2$--
Column 8, line 15 delete "πp"

Signed and Sealed this

Third Day of April, 2001

Attest:

NICHOLAS P. GODICI

Attesting Officer     Acting Director of the United States Patent and Trademark Office